United States Patent
Nakayama

(10) Patent No.: US 7,382,972 B2
(45) Date of Patent: Jun. 3, 2008

(54) RECORDING APPARATUS AND METHOD

(75) Inventor: Fumitaka Nakayama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 849 days.

(21) Appl. No.: 10/928,275

(22) Filed: Aug. 30, 2004

(65) Prior Publication Data

US 2005/0063676 A1 Mar. 24, 2005

(30) Foreign Application Priority Data

Sep. 24, 2003 (JP) ............................ 2003-331942

(51) Int. Cl.
*H04N 7/26* (2006.01)
*H04N 7/00* (2006.01)

(52) U.S. Cl. ...................... 386/111; 386/104
(58) Field of Classification Search ................ 386/111, 386/109, 112, 46, 96, 104, 124, 39
See application file for complete search history.

(56) References Cited

U.S. PATENT DOCUMENTS 6,327,423 B1 * 12/2001 Ejima et al. ................... 386/96

2004/0120689 A1 * 6/2004 Yamasaki ..................... 386/46
2004/0141727 A1 * 7/2004 Daijo .......................... 386/96

FOREIGN PATENT DOCUMENTS

| JP | 10-262211 | 9/1998 |
| JP | 11-203769 | 7/1999 |

* cited by examiner

*Primary Examiner*—Bob Chevalier
(74) *Attorney, Agent, or Firm*—Fitzpatrick, Cella, Harper & Scinto

(57) ABSTRACT

In a recording apparatus, an input moving image signal and sound signal are separately encoded. The encoded moving image signal and sound signal are recorded on a recording medium. When a recording stop instruction is input, recording of the encoded moving image signal is stopped while recording of the encoded sound signal is continued until a predetermined period elapses from stop of recording of the encoded moving image signal.

12 Claims, 9 Drawing Sheets

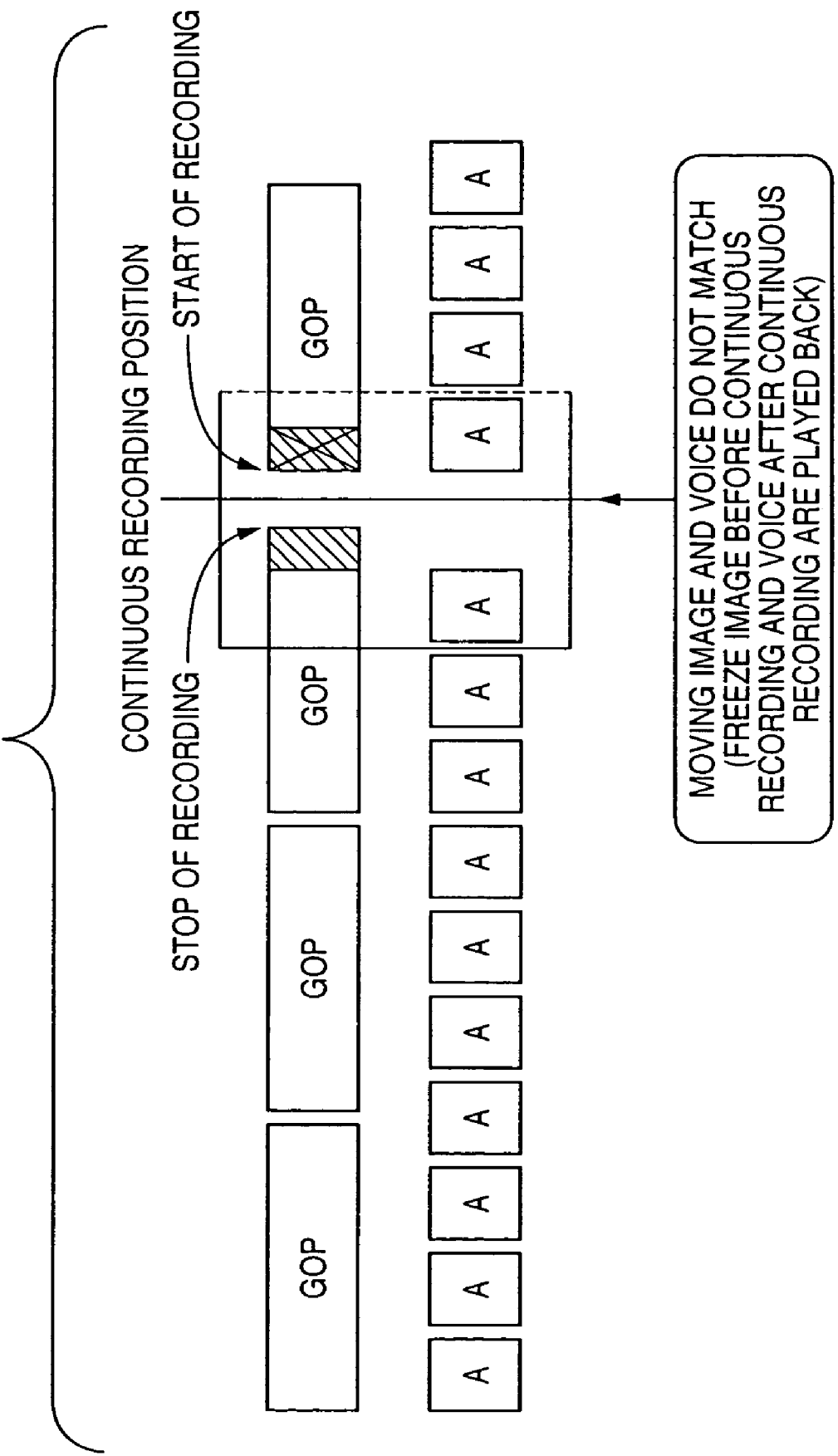

RECORDING APPARATUS AND METHOD

FIELD OF THE INVENTION

The present invention relates to the field of audio and video recording, and more particularly, to recording of digital moving image and sound signal.

BACKGROUND OF THE INVENTION

Conventionally, apparatuses which encode a moving image signal and a sound signal and records them on a magnetic tape or plays back them.

Particularly, of apparatuses of this type, VTRs which record or play back a moving image signal and a sound signal in accordance with an encoding scheme called DV format are known as consumer appliances. In the DV format, a moving image signal is encoded in a frame, and a sound signal corresponding to the moving image signal is encoded by PCM (Pulse Code Modulation) and recorded on a recording medium. The video signal and sound signal, which are encoded by the DV format are synchronized. Hence, when signals recorded on a magnetic tape by continuous recording are played back, the continuity of moving images and sound is maintained.

In recent years, VTRs which record a moving image signal and a sound signal on a magnetic tape by MPEG (Moving Picture Experts Group) have also made their debuts. Even for such VTRs using MPEG, methods which allow seamless playback in continuous recording have been proposed and disclosed in, e.g., Japanese Patent Laid-Open No. 10-262211.

In recording a video signal and a sound signal compressed by MPEG on a recording medium, the video signal is encoded for each GOP (Group Of Pictures) including a predetermined number of frames including intra-frame encoded images of one frame. However, the sound signal is encoded for an arbitrary number of samples.

For this reason, the encoding unit of moving image signals does not coincide with that of sound signals. Hence, as shown in FIG. 8, when recording of moving image signals is stopped, a sound signal of a frame for which encoding is not ended yet is not recorded. In playback, sound signals at the continuous recording portion cannot keep the continuity so that a silent portion is generated. This may make seamless playback impossible.

When recording is done by MPEG, as shown in FIG. 9, decoding of the start frame after continuous recording may be delayed due to a factor such as the VBV (Video Buffering Verifier) buffer control amount or GOP structure, and the image of the frame before the continuous recording may be played back in a freeze state. At this time, sound of the frame after the continuous recording is decoded and played back so that the moving image signal and sound signal, which are played back, do not match.

SUMMARY OF THE INVENTION

The present invention has been made to solve the above-described problems, and has as its object to make it possible to ensure the continuity of moving images and sound at a continuous recording portion when a moving image signal encoded by MPEG or the like is recorded together with a sound signal.

The above-described and other objects are attained by a recording apparatus and method according to the present invention. A recording apparatus according to one aspect of the present invention comprises an image encoding unit configured to encode a moving image signal by using an intra-frame coding scheme and an inter-frame coding scheme, a sound encoding unit configured to encode a sound signal, a recording unit configured to record the encoded moving image signal and the encoded sound signal on a recording medium, and a control unit configured to control the recording unit to stop the recording the encoded moving image signal in accordance with a recording stop instruction while continuing to record the encoded sound signal until a predetermined period elapses from stop of the recording of the encoded moving image signal.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 8 and 9 are views showing the states of moving image signals and sound signals in stopping recording by a conventional recording/playback apparatus.

DETAILED DESCRIPTION OF THE PREFERRED EMBODIMENTS

Preferred embodiments of the present invention will now be described in detail in accordance with the accompanying drawings.

Figure 1:
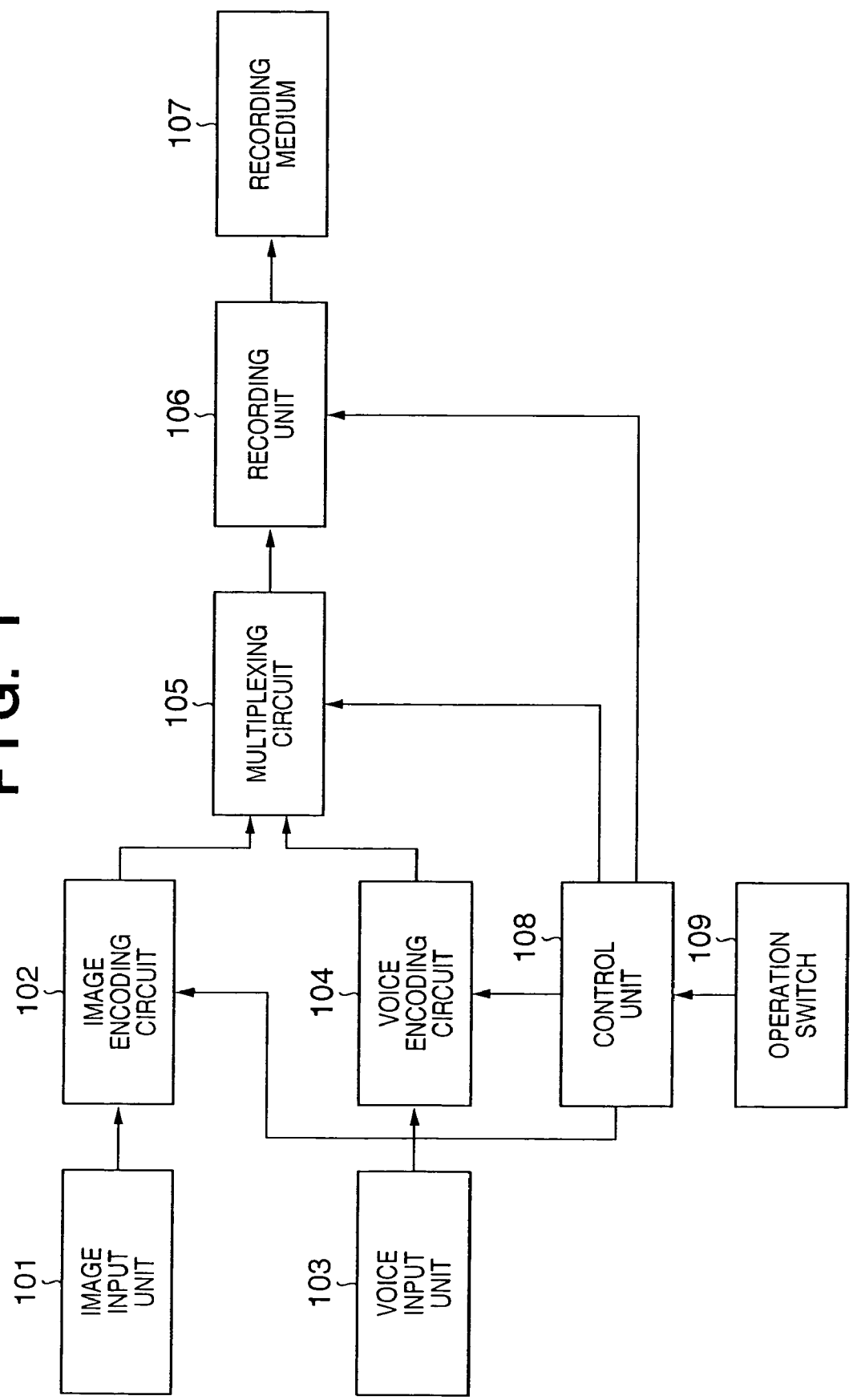
FIG. 1 is a block diagram showing the arrangement of the recording system of a recording/playback apparatus according to an embodiment of the present invention.

FIG. 1 is a block diagram showing the arrangement of the recording system of a recording/playback apparatus according to an embodiment of the present invention.

Referring to FIG. 1, an image input unit 101 inputs a moving image signal from a video camera or the like. An image encoding circuit 102 executes encoding processing of the input moving image signal.

The image encoding circuit 102 executes encoding by, e.g., MPEG. Although MPEG itself is a known technique, this will be described in detail. As a characteristic feature, the MPEG moving image format has a GOP (Group Of Pictures) structure to allow editing or random access. A GOP contains one or two or more intra-frame coded images (I pictures), zero or one or more forward predictive coded images (P pictures), and zero or one or more bidirectional predictive coded images (B pictures). That is, the image encoding circuit 102 of this embodiment encodes moving image signals by using an intra-frame coding scheme and an inter-frame coding scheme.

A sound input unit 103 inputs a sound signal. A sound encoding circuit 104 executes encoding processing for the input sound signal. The encoding scheme of the sound encoding circuit 104 is, e.g., MPEG such as MPEG audio layer 1, 2, or 3 in correspondence with the image encoding circuit 102.

A multiplexing circuit 105 multiplexes the moving image signal encoded by the image encoding circuit 102 and the sound signal encoded by the sound encoding circuit 104 in accordance with TS (transport stream) or PS (program stream) of MPEG. A recording unit 106 records the multiplexed MPEG-coded data on a recording medium 107 such as a DV tape. An operation switch 109 has various kinds of operation buttons such as a recording trigger button and a power switch. A control unit 108 controls the units of the apparatus in accordance with an instruction from the operation switch 109.

Referring to FIG. 1, when a recording start instruction is input from the operation switch 109, the control unit 108 controls the image encoding circuit 102 and sound encoding circuit 104 and causes them to start encoding a moving image signal and a sound signal. In addition, the control unit 108 controls the recording unit 106 and causes it to record MPEG data output from the multiplexing circuit 105 on a recording medium.

Processing by the control unit 108 for a recording stop instruction from the operation switch 109 after the start of recording will be described next with reference to the flowchart shown in FIG. 2.

Figure 2:
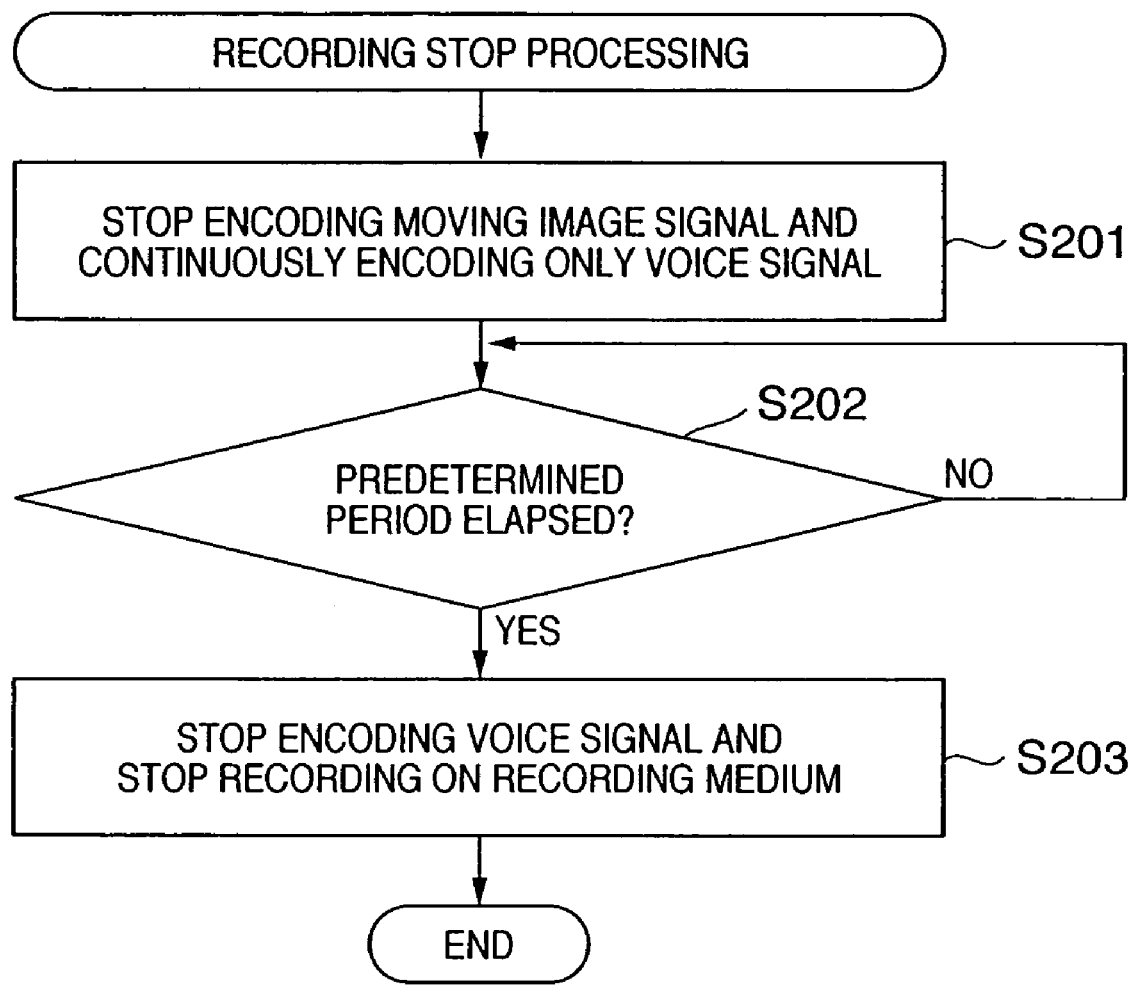
FIG. 2 is a flowchart showing recording stop processing by the recording/playback apparatus according to an embodiment of the present invention.

When a recording stop instruction is input from the operation switch 109, the flow shown in FIG. 2 starts.

Upon receiving a recording stop instruction, the control unit 108 first instructs the image encoding circuit 102 to stop encoding processing (S201). Upon receiving the encoding stop instruction, the image encoding circuit 102 stops encoding moving image signals as soon as encoding processing of all frames in the GOP which contains the frame at the time of stop instruction.

On the other hand, encoding processing of sound signals is continued until a period corresponding to a predetermined number of sound frames elapses after the stop of moving image signal recording. During this time, the multiplexing circuit 105 generates MPEG data by using only sound signals and output the data to the recording unit 106 (S202).

After the elapse of the predetermined period, MPEG data recording by the recording unit 106 is also stopped (S203).

Figure 3:
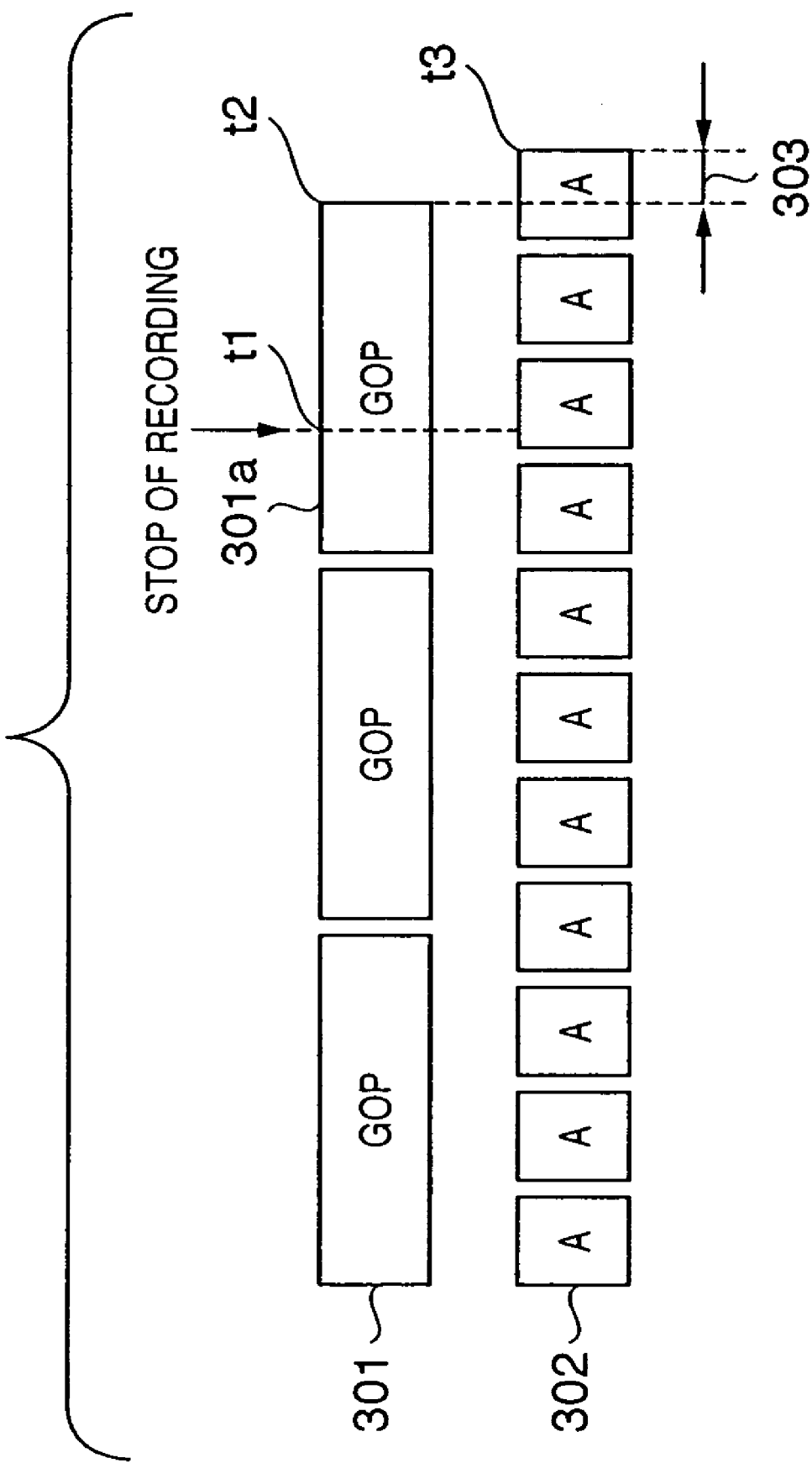
FIG. 3 is a view showing the states of moving image signals and sound signals when recording stop processing according to an embodiment of the present invention is executed.

FIG. 3 shows the states of moving image signals and sound signals when the above-described recording stop is executed.

Referring to FIG. 3, reference numeral 301 denotes a state of encoded moving image signals; and 302, a state of encoded sound signals. FIG. 3 illustrates the moving image signals and sound signals in separate lines to indicate the time relationship between them. In actually recording the moving image signals 301 and sound signals 302 on the recording medium 107, they are divided into packets each containing a predetermined amount of data. The divided packets are appropriately multiplexed to generate one MPEG data, and this data is recorded.

Referring to FIG. 3, when a recording stop instruction is received at timing t1, all frames in a GOP 301a which includes a frame that is being encoded at the timing t1, i.e., all frames up to timing t2 are encoded and recorded. After that, the encoding processing and recording processing of moving image signals are stopped.

All sound frames including a sound sample that is being encoded at the timing t2, i.e., all sound signals up to timing t3 are encoded. After that, the encoding processing and recording processing of sound signals are stopped. This processing is implemented by setting the predetermined period in step S202 to a period in which the entire sound frame containing the sound sample that is being encoded at the timing t2 when recording of encoded moving image signals is stopped can be encoded and recorded.

Referring to FIG. 3, the period from the stop of recording of moving image signals to the stop of recording of sound signals is indicated by 303. This period changes depending on the timing when encoding of moving image signals is stopped.

Processing in playing back thus recorded MPEG data will be described next.

Figure 4:
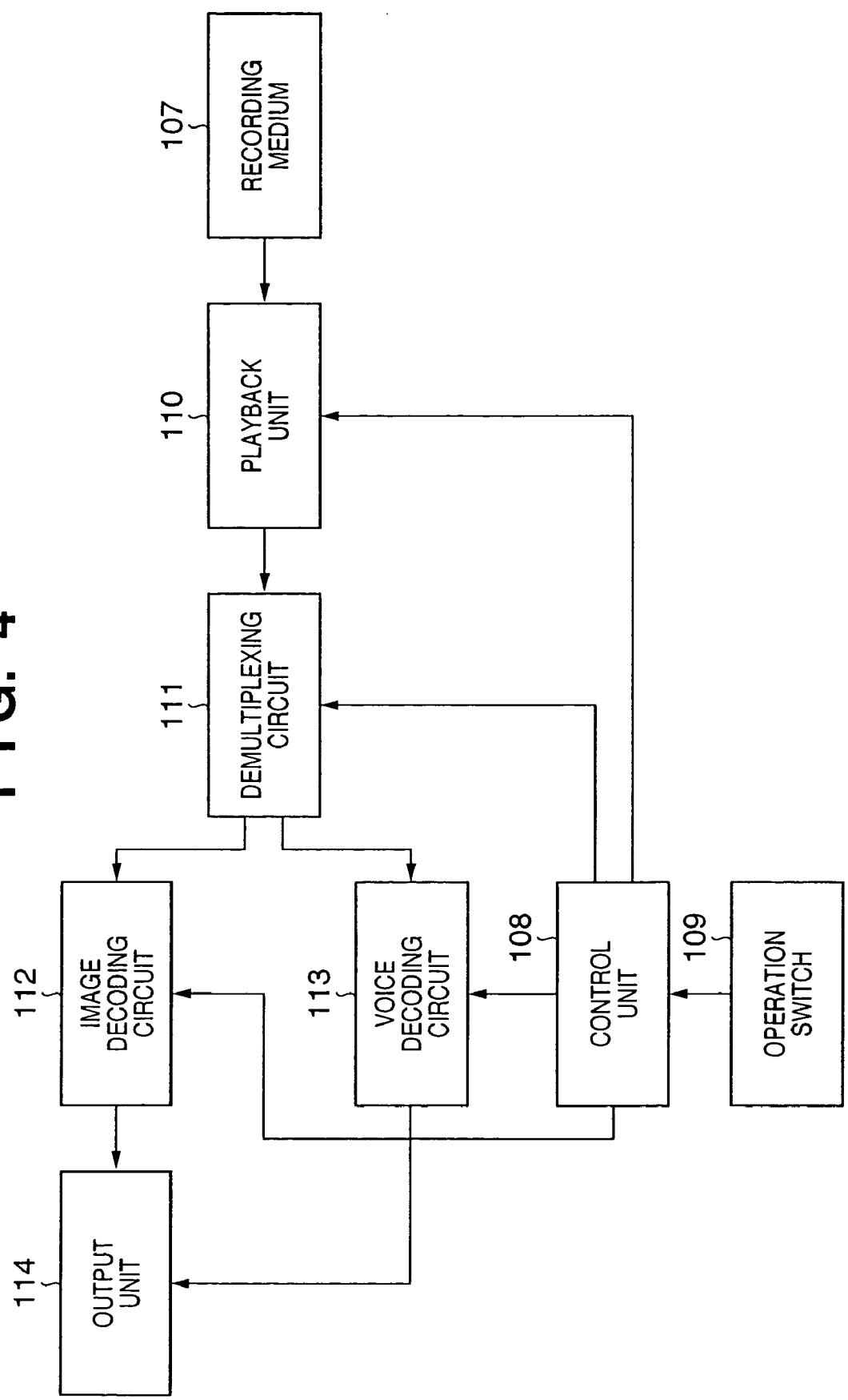
FIG. 4 is a block diagram showing the arrangement of the playback system of the recording/playback apparatus according to an embodiment of the present invention.

FIG. 4 is a block diagram showing the arrangement of the playback system of the recording/playback apparatus according to this embodiment. The same reference numerals as in FIG. 1 denote the same parts in FIG. 4.

Referring to FIG. 4, a playback unit 110 plays back MPEG data from the recording medium 107. A demultiplexing circuit 111 demultiplexes the MPEG data which is played back into a moving image signal and a sound signal. A moving image decoding circuit 112 and sound decoding circuit 113 decode the encoded moving image signal and sound signal, respectively. An output unit 114 outputs the moving image signal and sound signal to an external monitor and speaker.

Referring to FIG. 4, when a playback instruction is input from the operation switch 109, the control unit 108 controls the playback unit 110 and causes it to start playing back MPEG data from the recording medium 107. The playback unit 110 outputs the MPEG data which is played back to the demultiplexing circuit 111. The demultiplexing circuit 111 demultiplexes the MPEG data which is played back into an encoded moving image signal and an encoded sound signal. The moving image signal is output to the image decoding circuit 112. The sound signal is output to the sound decoding circuit 113.

The image decoding circuit 112 decodes the moving image signal which is played back and outputs it to the output unit 114. The sound decoding circuit 113 decodes the sound signal which is played back and outputs it to the output unit 114. The output unit 114 converts the decoded moving image signal and sound signal into a format suitable for the external monitor and the like and outputs the signals.

Figure 5:
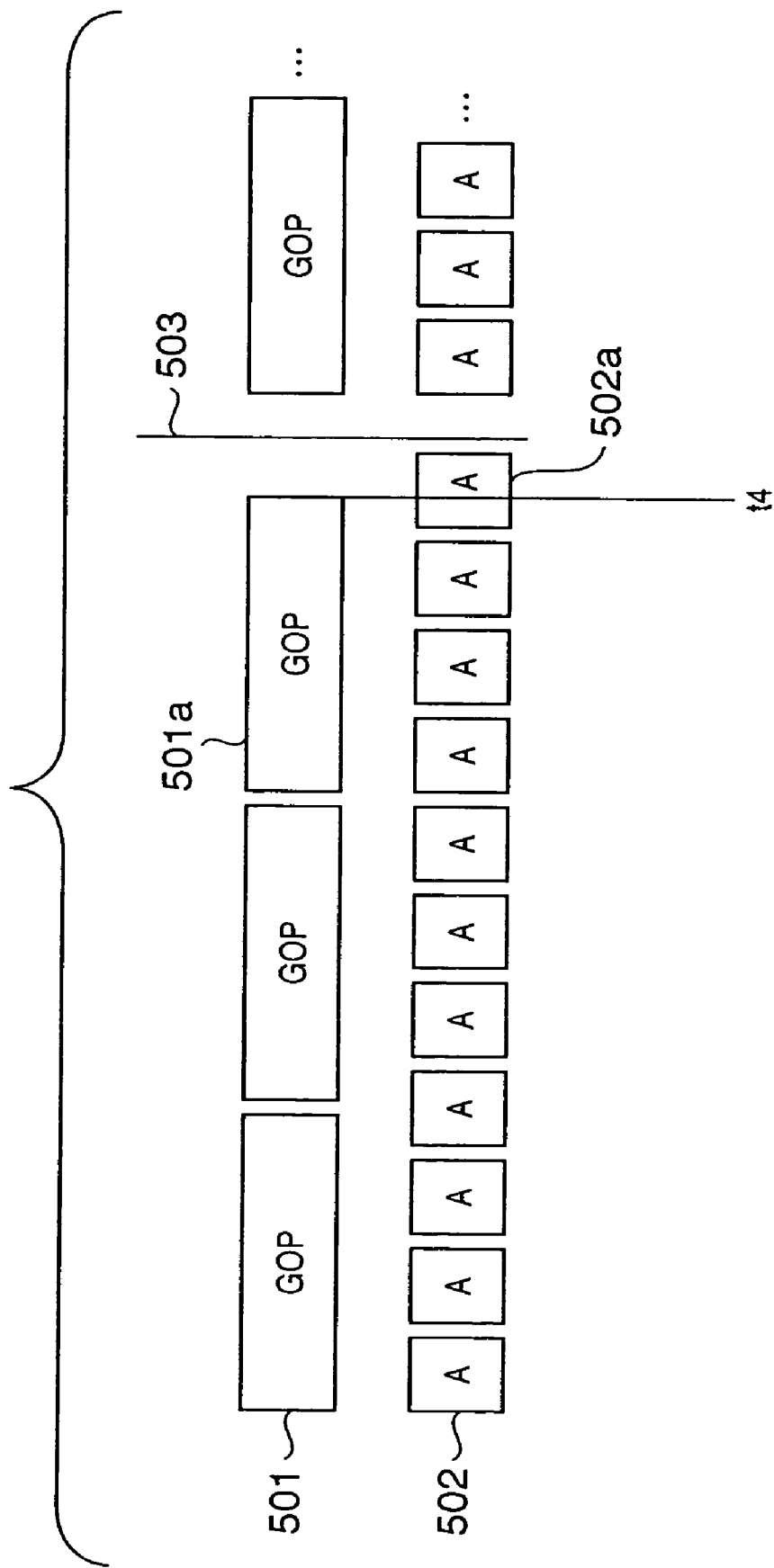
FIG. 5 is a view showing the states of moving image signals and sound signals in the playback mode of the recording/playback apparatus according to an embodiment of the present invention.

Sound signal playback processing at a continuous recording portion will be described next with reference to FIG. 5. In this embodiment, when recording is stopped, moving image signals and sound signals are recorded as in FIG. 3. FIG. 5 is a view showing playback processing of thus recorded data.

Referring to FIG. 5, reference numerals 501 and 502 denote moving image signals and sound signals, respectively, as in FIG. 3; 501a, a GOP which is recorded finally in accordance with a recording stop instruction; 502a, a sound frame which is recorded finally; and 503, a continuous recording position. Data from the continuous recording position 503 is data recorded newly by continuous recording.

In the playback mode, the control unit 108 detects the playback timing of the last GOP 501*a* and controls the sound decoding circuit 113 and playback unit 110 such that the decoding and playback processing of sound signal are continued until playback timing t4. After playback up to t4, playback and decoding of the next moving image signal and sound signal which are recorded by continuous recording are started.

As described above, in this embodiment, even after sound signal recording is stopped in accordance with a recording stop instruction, sound signals are continuously recorded. Recording is stopped at a timing when a predetermined amount of sound signals is recorded. Hence, in the playback mode, any loss in sound at the recording stop portion can be prevented.

In this embodiment, an entire sound frame containing a sound sample that is being encoded when encoding of moving image signals is stopped is encoded. Then, the encoding processing of sound signals is stopped. Instead, encoding may be continued for sound signals corresponding to not only one frame but a plurality of frames, and then, recording may be stopped.

Figure 6:
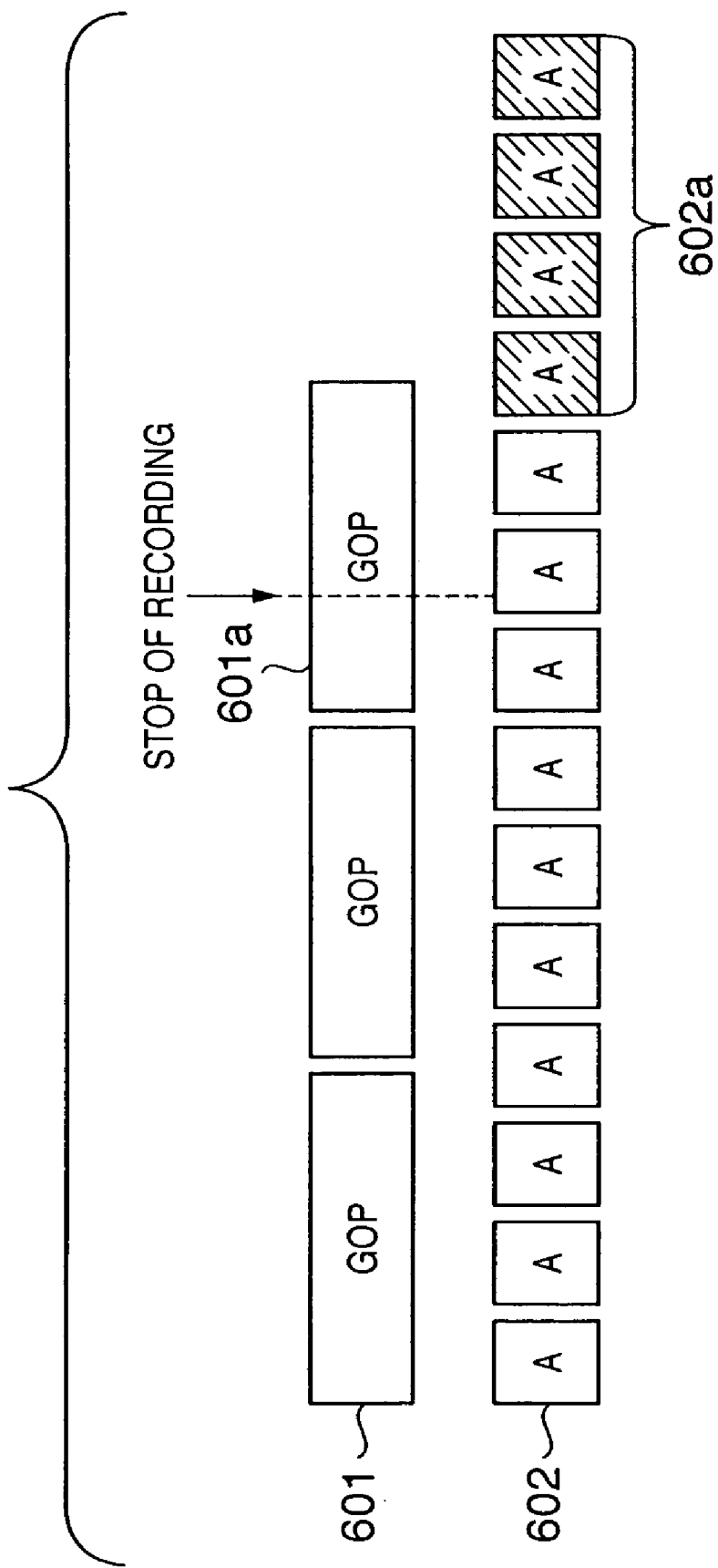
FIG. 6 is a view showing the states of moving image signals and sound signals when recording stop processing by an recording/playback apparatus according to another embodiment of the present invention is executed.

More specifically, for example, as shown in FIG. 6, after stop of recording of moving image signals, sound signals corresponding to four sound frames from the frame containing the recording stop timing are recorded. Then, the processing is stopped. This arrangement can be implemented by setting the predetermined period in step S202 to a period in which the sound frame containing the sound sample that is being encoded when recording of encoded moving image signals is stopped and four subsequent frames can be encoded and recorded.

Figure 7:
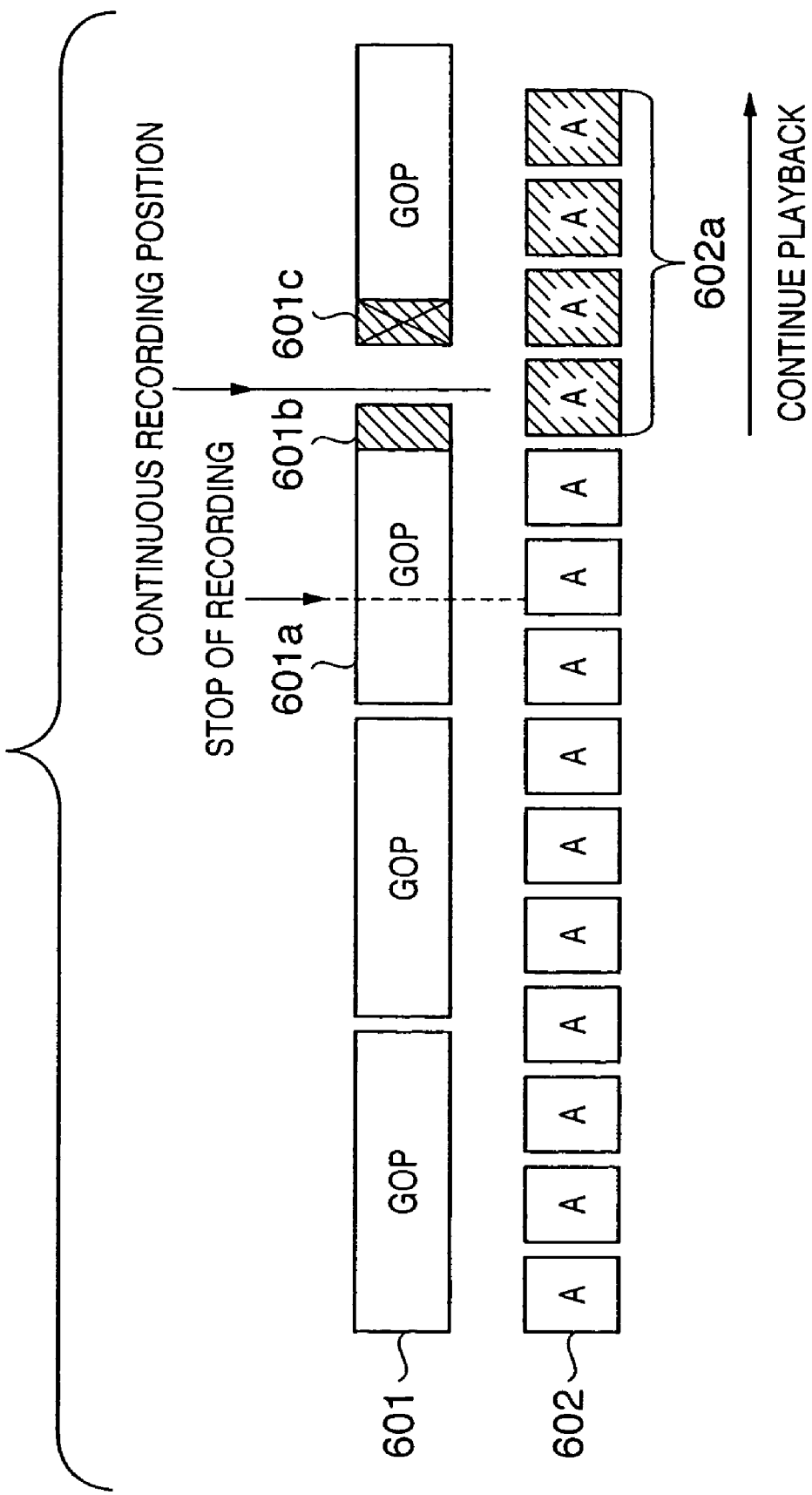
FIG. 7 is a view showing the states of moving image signals and sound signals in the playback mode of the recording/playback apparatus according to another embodiment of the present invention.
Figure 8:
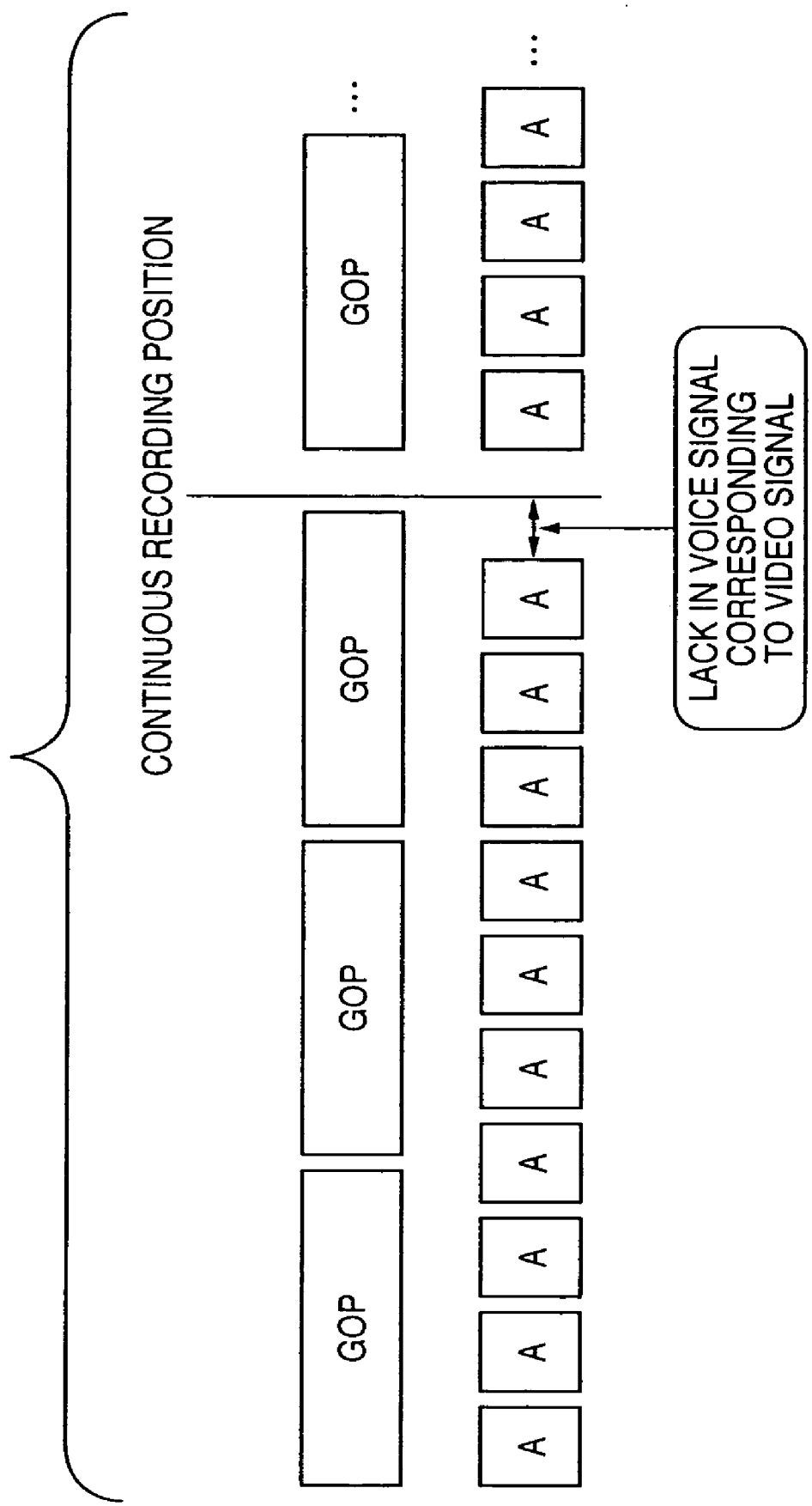

In the playback mode, as shown in FIG. 7, if a first frame 601*c* in the GOP after the start of continuous recording cannot be played back and displayed because of the influence of the VBV buffer or GOP structure, a last frame 601*b* at the continuous recording portion is displayed in a freeze state. At this time, the control unit 108 controls the playback unit 110 and sound decoding circuit 113 to play back and decode sound signal 602*a*, thereby maintaining the relationship between the video signals and the sound signals.

The present invention is not limited to the above embodiments and various changes and modifications can be made within the spirit and scope of the present invention. Therefore, to apprise the public of the scope of the present invention, the following claims are made.

CLAIM OF PRIORITY

This application claims priority from Japanese Patent Application No. 2003-331942 filed on Sep. 24, 2003, which is hereby incorporated by reference herein.

What is claimed is:

1. A recording apparatus comprising:
    an image encoding unit configured to encode a moving image signal by using an intra-frame coding scheme and an inter-frame coding scheme;
    a sound encoding unit configured to encode a sound signal;
    a recording unit configured to record the encoded moving image signal and the encoded sound signal on a recording medium; and
    a control unit configured to control said recording unit to stop the recording the encoded moving image signal in accordance with a recording stop instruction while continuing to record the encoded sound signal until a predetermined period elapses from stop of the recording of the encoded moving image signal.

2. The apparatus according to claim 1, wherein said image encoding unit is configured to encode the moving image signal for each group including a frame encoded by the intra-frame coding scheme and a frame encoded by the inter-frame coding scheme, and
    said recording unit is configured to record the encoded moving image signal for each group.

3. The apparatus according to claim 1, wherein said sound encoding unit is configured to encode the sound signal for each sound frame containing a predetermined number of samples, and
    said recording unit is configured to record the sound signal for each sound frame.

4. The apparatus according to claim 3, wherein the predetermined period is a period in which the entire sound frame containing a sound signal which is being encoded at a timing when recording of the encoded moving image signal is stopped can be encoded and recorded.

5. The apparatus according to claim 3, wherein the predetermined period is a period in which the sound frame containing a sound signal which is being encoded at a timing when recording of the encoded moving image signal is stopped and at least one subsequent frame can be encoded and recorded.

6. The apparatus according to claim 1, wherein said recording unit includes a multiplexing unit configured to multiplex the encoded moving image signal and the encoded sound signal to generate an encoded data sequence, said multiplexing unit generating the encoded data sequence by using only the encoded sound signal after recording of the encoded moving image signal is stopped in accordance with the recording stop instruction until recording of the encoded sound signal is stopped.

7. A recording method comprising the steps of:
    encoding a moving image signal by using an intra-frame coding scheme and an inter-frame coding scheme;
    encoding a sound signal;
    recording the encoded moving image signal and the encoded sound signal on a recording medium; and
    controlling to stop the recording the encoded moving image signal in accordance with a recording stop instruction while continuing to record the encoded sound signal until a predetermined period elapses from the stop of the recording of the encoded moving image signal.

8. The method according to claim 7, wherein the step of encoding the moving image signal comprises encoding the moving image signal for each group including a frame encoded by the intra-frame coding scheme and a frame encoded by the inter-frame coding scheme, and
    the step of recording comprises recording the moving image signal for each group.

9. The method according to claim 7, wherein the step of encoding the sound signal comprises encoding the sound signal for each sound frame containing a predetermined number of samples, and
    the step of recording comprises recording the sound signal for each sound frame.

10. The method according to claim 9, wherein the predetermined period is a period in which the entire sound frame containing a sound signal which is being encoded at a timing when recording of the encoded moving image signal is stopped can be encoded and recorded.

11. The method according to claim 9, wherein the predetermined period is a period in which the sound frame containing a sound signal which is being encoded at a timing when recording of the encoded moving image signal is stopped and at least one subsequent frame can be encoded and recorded.

12. The method according to claim 7, wherein the step of recording further comprising the step of multiplexing the encoded moving image signal and the encoded sound signal to generate an encoded data sequence, the step of multiplexing comprises generating the encoded data sequence by using only the encoded sound signal after recording of the encoded moving image signal is stopped in accordance with the recording stop instruction until recording of the encoded sound signal is stopped.

* * * * *

UNITED STATES PATENT AND TRADEMARK OFFICE
CERTIFICATE OF CORRECTION

PATENT NO. : 7,382,972 B1
APPLICATION NO. : 10/928275
DATED : June 3, 2008
INVENTOR(S) : Fumitaka Nakayama It is certified that error appears in the above-identified patent and that said Letters Patent is hereby corrected as shown below:

COLUMN 2
Line 44, "an" should read --a--.

COLUMN 3
Line 56, "output" should read --outputs--.

Signed and Sealed this

Ninth Day of December, 2008

JON W. DUDAS
*Director of the United States Patent and Trademark Office*